United States Patent [19]

Mamiya et al.

[11] Patent Number: 5,249,130
[45] Date of Patent: Sep. 28, 1993

[54] AIR-FUEL RATIO CONTROL APPARATUS FOR AN ALCOHOL ENGINE

[75] Inventors: Kiyotaka Mamiya; Ichiro Yamagata, both of Higashihiroshima; Katuhiro Yokomizo, Hiroshima; Takayoshi Hayashi, Yamaguchi, all of Japan

[73] Assignee: Mazda Motor Corporation, Hiroshima, Japan

[21] Appl. No.: 763,241

[22] Filed: Sep. 20, 1991

[30] Foreign Application Priority Data

Sep. 20, 1990 [JP] Japan .................. 2-248649

[51] Int. Cl.$^5$ .................. F02M 51/00; G06F 15/48
[52] U.S. Cl. .................. 364/431.05; 364/431.06; 123/681
[58] Field of Search .................. 364/431.05, 431.06, 364/431.01; 123/1 A, 418, 417, 481, 492, 494

[56] References Cited

U.S. PATENT DOCUMENTS

| | | | |
|---|---|---|---|
| 4,823,270 | 4/1989 | Nagai | 364/431.05 |
| 4,911,129 | 3/1990 | Tomisawa | 123/489 |
| 4,957,088 | 9/1990 | Hosaka | 123/492 |
| 4,964,390 | 10/1990 | Kameta et al. | 123/489 |
| 4,967,714 | 11/1990 | Inoue | 123/489 |
| 5,018,483 | 5/1991 | Kashima et al. | 123/1 A |
| 5,024,199 | 6/1991 | Abe | 123/489 |
| 5,050,561 | 9/1991 | Kashiwabara et al. | 123/489 |
| 5,065,727 | 11/1991 | Sakaguchi et al. | 123/489 |
| 5,077,971 | 1/1992 | Kumagai et al. | 60/276 |
| 5,090,389 | 2/1992 | Oota | 123/1 A |

FOREIGN PATENT DOCUMENTS

1-244133 9/1989 Japan .

Primary Examiner—Thomas G. Black
Assistant Examiner—Tan Q. Nguyen
Attorney, Agent, or Firm—Fish & Richardson

[57] ABSTRACT

An air-fuel ratio control apparatus for an alcohol engine driven by fuel containing an alcohol component, where oxygen density of the exhaust gas is detected by an $O_2$ sensor and an air-fuel ratio is controlled to approach a theoretical air-fuel ratio in response to the oxygen density detected by the $O_2$ sensor, is disclosed. The apparatus comprises an engine load detecting means for detecting engine load, and a control unit for correcting the air-fuel ratio to be rich in response to engine load such that the degree of the correction becomes larger as the engine load becomes small.

13 Claims, 5 Drawing Sheets

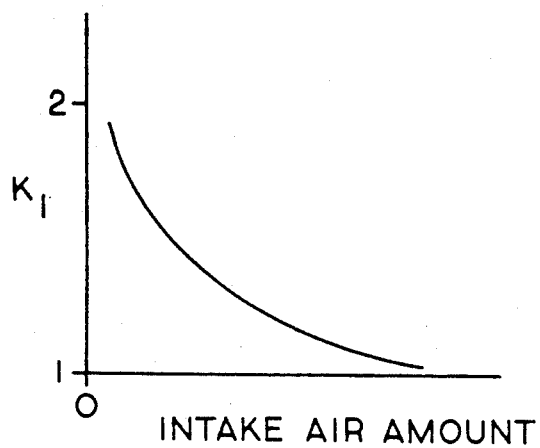
FIG.3
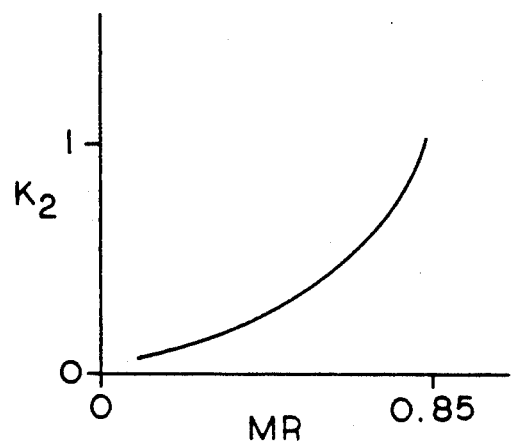
FIG.4
FIG.5a
O₂ SENSOR OUTPUT
FIG.5b
TLR
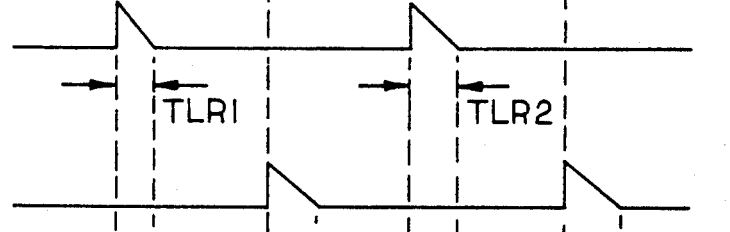
FIG.5c
TRR
FIG.5d
DELAYED O₂
SENSOR
OUTPUT
FIG.5e
CFB
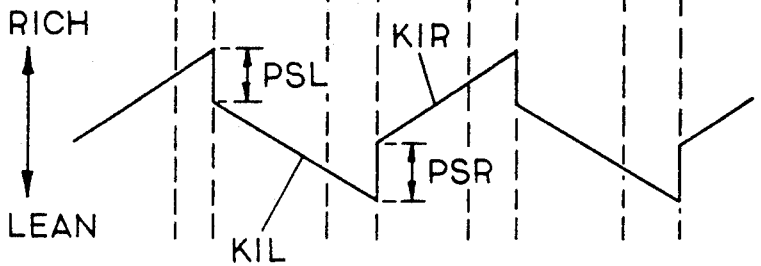

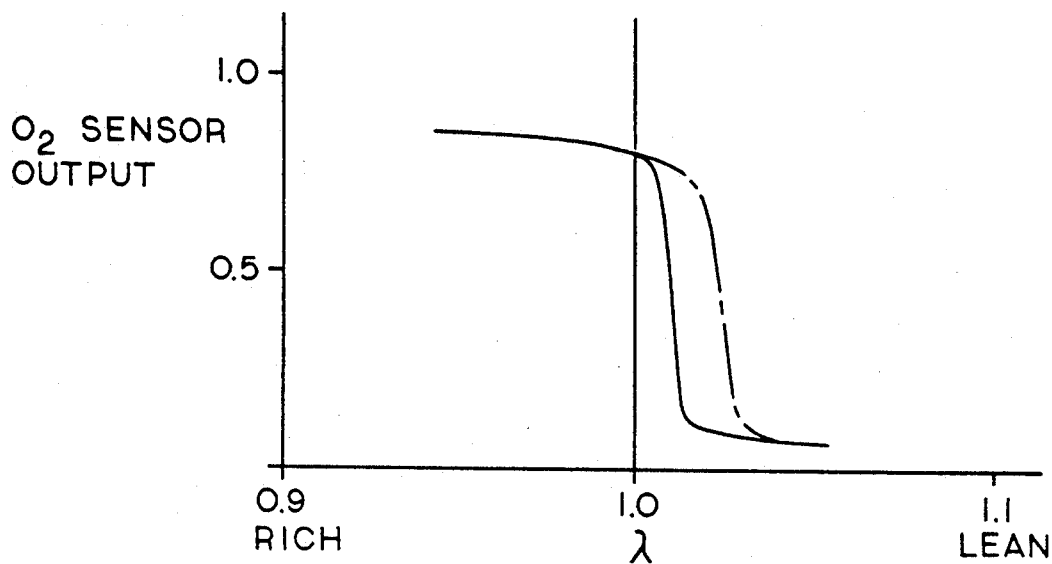
FIG.6
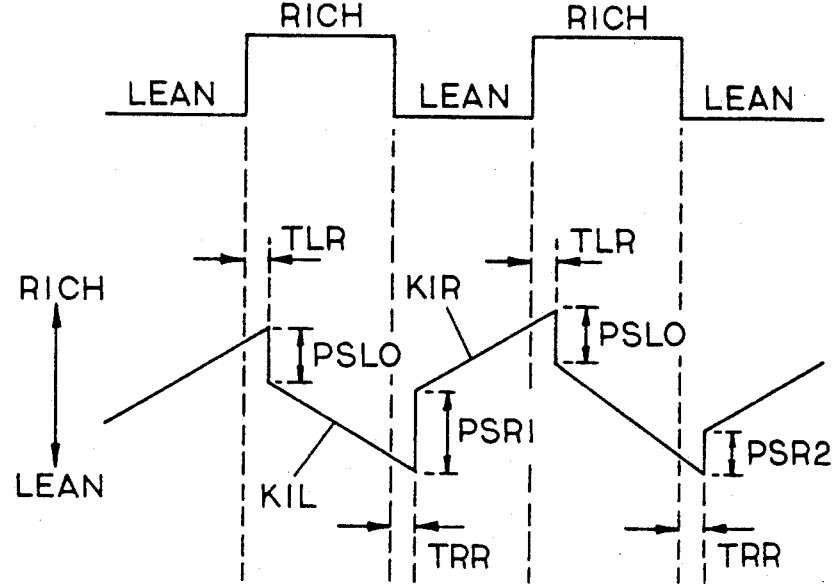

FIG.8a
O₂ SENSOR OUTPUT
FIG.8b
CFB
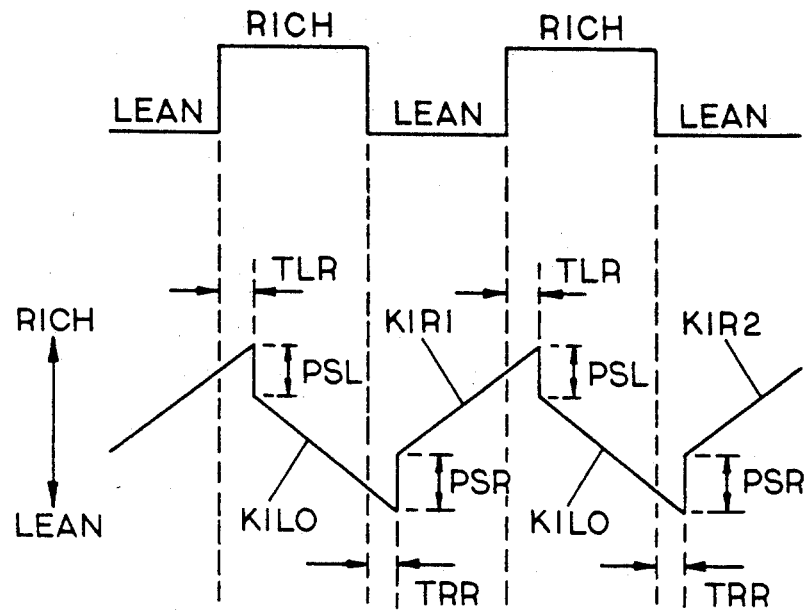
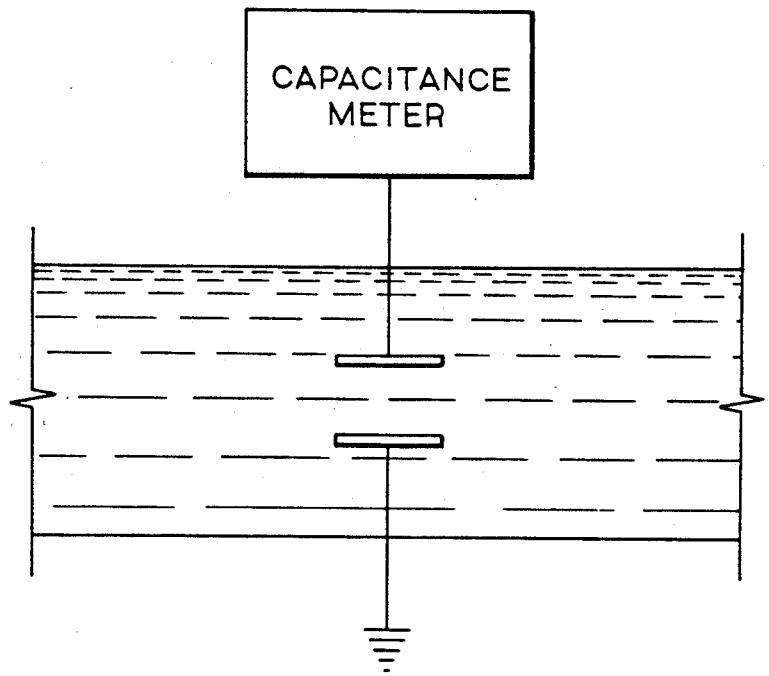
FIG.9 (PRIOR ART)

AIR-FUEL RATIO CONTROL APPARATUS FOR AN ALCOHOL ENGINE

FIELD OF THE INVENTION

The invention relates to an air-fuel ratio control apparatus for an alcohol engine driven by fuel containing an alcohol component.

BACKGROUND OF THE INVENTION

In general, control of the air-fuel ratio in an engine, whether gasoline or alcohol, is carried out such that, first of all, a basic control factor such as the fuel injection quantity (or injection time) of a fuel injector is adjusted according to engine driving conditions such as intake air amount per engine revolution and/or intake pressure in an intake passage. The basic fuel injection quantity is then modified by multiplying various air-fuel ratio correction coefficients, such as an engine temperature correction coefficient and/or a feedback control correction coefficient, to finally obtain a target fuel injection quantity (or injection time), thereby controlling the actual air-fuel ratio to conform to the theoretical air-fuel ratio at any given time.

Moreover, the feedback coefficient is decreased when the air-fuel ratio, judged by the oxygen density in the exhaust gas detected by an oxygen ($O_2$) sensor, is smaller than the theoretical air-fuel ratio of 14.7 (i.e., lean). Conversely, the feedback coefficient is increased when the air-fuel ratio is larger than the theoretical air-fuel ratio (i.e., rich).

The $O_2$ sensor includes a zirconia element which generates a certain amount of voltage when oxygen ions pass through it. The $O_2$ sensor is usually constructed to introduce an atmospheric reference gas inside the zirconia element, and exhaust gas outside the zirconia element. Therefore, when the oxygen density of the exhaust gas is high, that is, when its air-fuel ratio is larger than the theoretical air-fuel ratio (lean), the voltage generated in the zirconia element becomes small. On the other hand, when the oxygen density of the exhaust gas is low (rich), the voltage generated in the zirconia element becomes large.

However, it should be noted that, if an engine uses fuel containing an alcohol component, the amount of hydrogen ($H_2$) in the combustion gas becomes larger compared with the $H_2$ amount in a combustion gas generated from gasoline. Since a $H_2$ molecule is smaller than an $O_2$ molecule, the $H_2$ molecule diffuses with greater speed than the $O_2$ molecule and thus the $H_2$ molecule enters into the zirconia element more easily than the $O_2$ molecule. Therefore, the $O_2$ sensor mistakenly judges the oxygen density as if it were lower than the actual density, due to this diffusion disparity between $H_2$ and $O_2$. The result is the so-called lean shift phenomenon, where the output characteristic of the $O_2$ sensor shifts toward the lean side, as shown by the dotted line in FIG. 6.

Accordingly, if the feedback control is carried out under the lean shift condition, the air-fuel ratio is controlled to be much leaner than required for operation of a rhodium catalytic converter as an exhaust gas purification device. A resulting problem is that the purification efficiency of NOx deteriorates.

Japanese laid-open patent application No. 01/244,133 discloses a fuel injection control apparatus in which the lean shift phenomenon of the $O_2$ sensor is modified by correcting the air-fuel ratio to be richer as an alcohol density, by which the amount of $H_2$ in the combustion gas increases, becomes large. The lean shift phenomenon of the $O_2$ sensor due to the alcohol density of the fuel can be effectively suppressed with this apparatus.

However, even though the lean shift phenomenon of the $O_2$ sensor is modified based on the alcohol density of the fuel, the air-fuel ratio is still controlled to be lean, and thus it is feared that the efficiency of the rhodium catalytic converter is impaired.

SUMMARY OF THE INVENTION

To resolve the problems described above, the inventors have studied have the phenomena involved and found that, when an engine load is small, charging efficiency becomes lower and an intake air amount also becomes small. Therefore, $H_2$ density in the combustion gas becomes large, and the lean shift phenomenon of the $O_2$ sensor is induced.

The invention provides an air-fuel ratio control apparatus for an alcohol engine, where the oxygen density of the exhaust gas is detected by an oxygen detecting means and the air-fuel ratio is controlled to approach a theoretical air-fuel ratio in response to the oxygen density detected by the oxygen detecting means. This apparatus includes load detecting means for detecting engine load, and correcting means for correcting the air-fuel ratio in response to the engine load detected by the load detecting means such that the air-fuel ratio is corrected to be rich as the engine load becomes small.

In the air-fuel ratio control apparatus for an alcohol engine of the invention, the air-fuel ratio is corrected to be rich in response to diminishing engine load, so shifting of the air-fuel ratio to the lean side due to the lean shift phenomenon of the $O_2$ sensor is prevented. As a result, maintenance of the air-fuel ratio at or close to the theoretical air-fuel ratio becomes possible.

These and other features of the invention will be apparent from the following description with reference to the accompanying drawings.

BRIEF DESCRIPTION OF THE DRAWINGS

FIG. 3 is a map showing a characteristic line representing a relationship between a load characteristic constant and an intake air amount;

FIG. 4 is a map showing a characteristic line representing a relationship between a methanol density characteristic constant and a methanol density;

FIGS. 5(a)–5(e) collectively constitute a timing chart illustrating the air-fuel ratio control by the air-fuel ratio control apparatus;

FIG. 6 is a graph showing the effect of hydrogen on the output of an oxygen sensor;

FIGS. 7(a) and 7(b) are a timing chart in accordance with a second embodiment of the present invention;

FIGS. 8(a) and 8(b) are a timing chart in accordance with a third embodiment of the present invention;

FIG. 9 is a schematic diagram of an electrostatic fuel sensor of a conventional type.

DESCRIPTION OF PREFERRED EMBODIMENTS

Embodiments of an air-fuel ratio control apparatus for an alcohol engine in accordance with the invention are explained in more detail, with reference to the Drawings. In the alcohol engine, any fuel containing alcohol may be used. The invention may also be used where alcohol is not included in the fuel, although there is little point in doing so unless fuel containing alcohol is not available.

Figure 1:
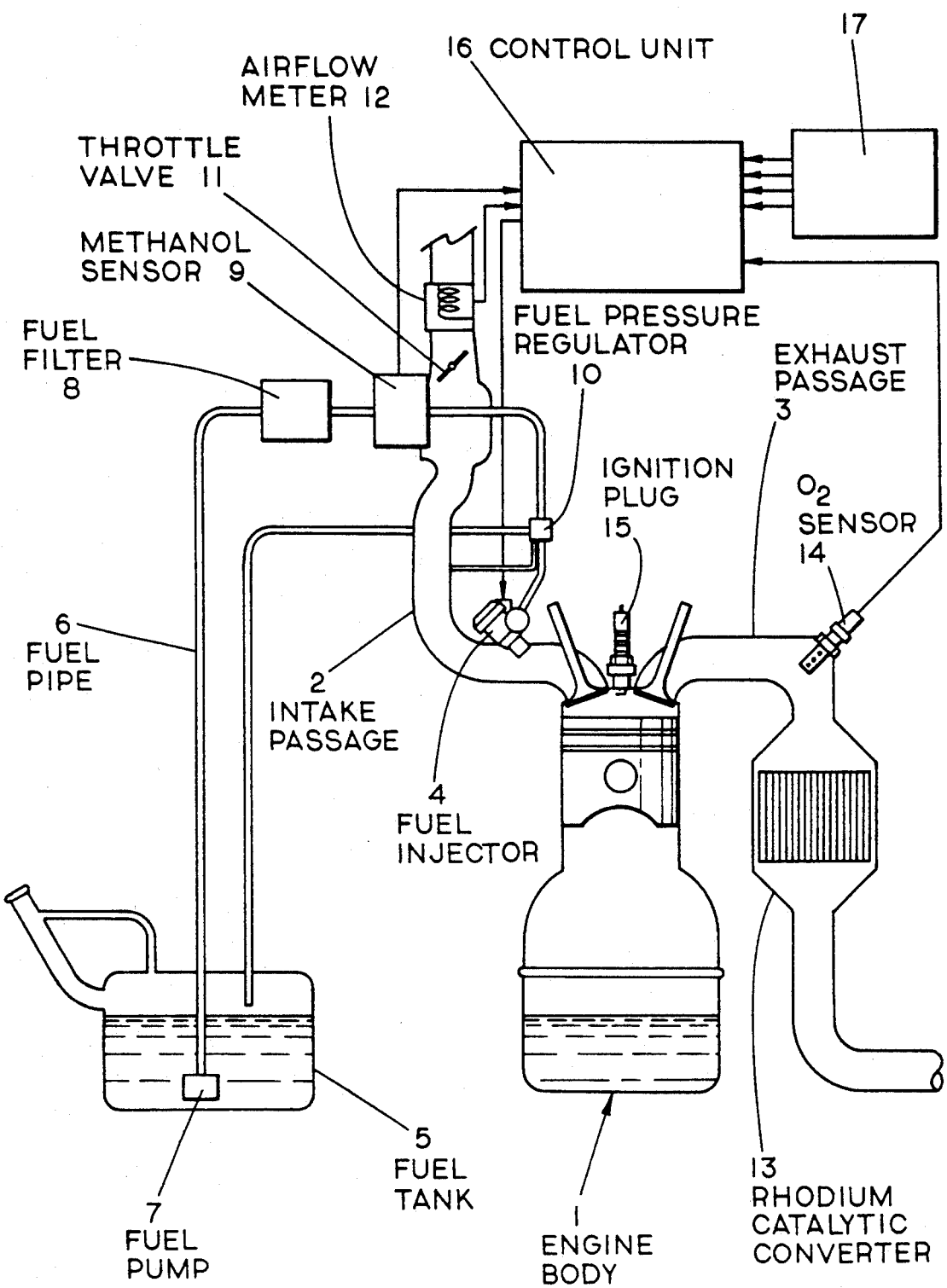
FIG. 1 is a schematic diagram showing an alcohol engine equipped with an air-fuel ratio control apparatus in accordance with a first embodiment of the invention.

FIG. 1 is a schematic diagram showing an alcohol engine equipped with an air-fuel ratio control apparatus in accordance with a first embodiment of the invention. An engine body 1, as in usual gasoline engines, is connected with an intake passage 2 and an exhaust passage 3. The intake passage 2 is equipped with a fuel injector 4 for injecting fuel. Fuel is fed to the fuel injector 4 from a fuel tank 5 through a fuel pipe 6. A fuel pump 7 is provided at a bottom portion of the fuel pipe 6, by which fuel accommodated in the fuel tank 5 is pressurized to feed into the fuel pipe 6.

The fuel pipe 6 is equipped with a fuel filter 8, a methanol sensor 9, and an upstream fuel pressure regulator 10. The methanol sensor 9 is provided for detecting the alcohol density of the fuel supplied from the fuel tank 5, and can be, for example, a well known electrostatic type or an optical sensor type. As shown in FIG. 9, the electrostatic type alcohol sensor detects the methanol density in the fuel based on the principle that the dielectric constant of the fuel changes in accordance with the methanol content.

The fuel pressure regulator 10 is provided for maintaining fuel pressure at a predetermined level, so that the fuel injection quantity can be accurately controlled by changing the opening time of the fuel injector 4.

At the upstream side of the intake passage 2, a throttle valve 11 and a hot-wire type airflow meter 12 are provided. In the exhaust passage 3 there are provided a rhodium catalytic converter 13 for purifying NOx, and an $O_2$ sensor 14 disposed at an upstream side of the rhodium catalytic converter 13 for detecting the oxygen density of the exhaust gas. The engine body 1 is equipped with an ignition plug 15.

The fuel injector 4 is connected to a control unit 16, which comprises a microcomputer controlling a fuel injection quantity and injection timing of the fuel injector 4. The control unit 16 is connected, besides with the methanol sensor 9, the airflow meter 12, and $O_2$ sensor 14, with various sensors for detecting engine operating conditions, such as a cooling water temperature sensor, an engine speed sensor and so on, so as to receive output signals from these sensors and to control the fuel injector 4 in response to these output signals.

Figure 2:
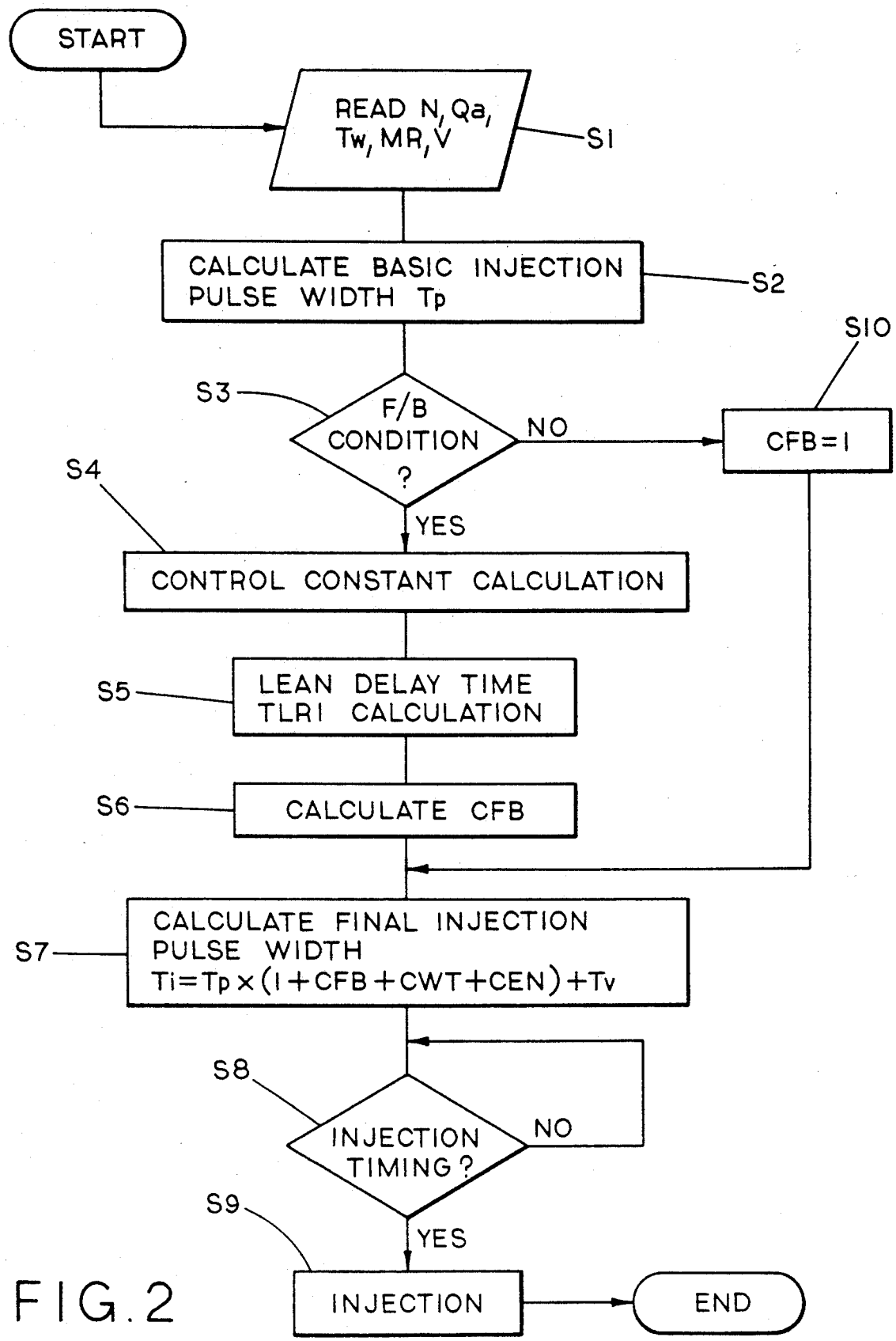
FIG. 2 is a flow chart illustrating an air-fuel ratio control in the air-fuel ratio control apparatus.

Referring now to the flow chart shown in FIG. 2, the control of the fuel injector 4 by the control unit 16 is explained in detail.

In step S1, an engine speed N, an intake air amount Qa, a cooling water temperature Tw, a methanol density Mr, an oxygen density V and so on are read. Next, at step S2, a basic injection pulse width Tp is calculated according to the following equation:

$$Tp = K \times Qa/N,$$

where K is a constant.

In step S3, it is judged whether a feedback control condition is satisfied by checking if an engine operational condition is in a predetermined feedback zone, whether the calculated basic injection pulse width Tp and the engine speed N are smaller than a predetermined pulse width and a predetermined speed, respectively, and if the cooling water temperature Tw is higher than a predetermined temperature. When the judgment is YES in step S3, in step S4 the control unit 16 next calculates control constants including an integral constant for integral control (feedback gain) and a proportional constant for proportional control in response to the difference between an actual air-fuel ratio based on the oxygen density V and the theoretical air-fuel ratio.

After this calculation of control constants in step 4, in step S5 a lean delay time TLR, i.e, time which is required to shift from rich to lean, is calculated. This calculation is performed in such a manner that a load characteristic constant K1 is obtained by comparing the intake air amount Qa with a characteristic line representing a relationship between a load characteristic constant K1 and an intake air amount Qa, which relationship is stored in memory in control unit 16 in the form of a control map as shown in FIG. 3. A methanol density characteristic constant K2 is also obtained by comparing the methanol density MR with a characteristic line representing a relationship between a methanol density characteristic constant K2 and a methanol density MR, which relationship is stored in memory in the control unit 16 in the form of a control map as shown in FIG. 4.

Moreover, the load characteristic constant K1 is designed to be smaller as the intake air amount Qa, i.e., engine load, becomes larger, so as to correspond to the amount of generated $H_2$, which increases as the engine load decreases. The methanol density characteristic constant K2 is designed to be larger as the methanol density MR, i.e., alcohol density of fuel, becomes larger, so as to correspond to the amount of generated $H_2$, which increases as the methanol density MR increases.

Then, the actual lean delay time TLR is calculated according to the following equation:

$$TLR = TLRO \times K1 \times K2$$

where TLRO is a lean delay time corresponding to a pure gasoline engine.

Consequently, the actual lean delay time TLR is designed to become larger as the intake air amount Qa becomes small or as the methanol density MR becomes large. The actual air-fuel ratio is controlled to be rich as the lean delay time TLR becomes longer.

After that, in step S6, a feedback correction coefficient CFB is calculated by taking into account the calculated lean delay time TLR, and in step S7 a final injection pulse width Ti is calculated based on the following equation:

$$Ti = Tp \times (1 + CFB + CWT + CEN) + Tv,$$

where CWT is a cooling water temperature correction coefficient, CEN is a methanol density correction coefficient, and Tv is an invalid injection time beyond which the valve will not move even when a signal is applied to it. The period Tv depends upon the system voltage provided by the battery in the vehicle.

Finally, the control unit 16 judges whether the injection timing has arrived or not in step S8, and the control unit 16 actuates the injection valve 4 to inject fuel by the final injection pulse width Ti, completing one routine of the flow chart.

On the other hand, when the judgment in step S3 is NO, that is, when the feedback condition is not satisfied yet, the control unit 16 sets the feedback correction coefficient CFB to be 1 in step S10, and then proceeds to step S7, and then to steps S8 and S9, completing one alternative routine of the flow chart.

The control described above can be shown in a timing chart, as shown in FIGS. 5(a)-5(e).

As shown in FIG. 5(a), the $O_2$ sensor outputs a pulsed air-fuel ratio signal indicating rich or lean. The output of the $O_2$ sensor is usually the result of comparison of the voltage generated in the zirconia element to a predetermined voltage corresponding to the theoretical air-fuel ratio. As shown in FIG. 5(b), the lean delay time TLR is determined in such a manner that it becomes a smaller value TLR1 when the engine load is heavy, but becomes a larger value TLR2 when the engine load is light.

On the other hand, a rich delay time TRR, which is defined to be the time required to shift from lean to rich, is fixed to be a predetermined constant TRR0 regardless of the amount of the engine load, as shown in FIG. 5(c).

As a result, as shown in FIG. 5(d), a delayed air-fuel ratio signal is obtained.

Therefore, even if actual output of the $O_2$ sensor is changed, the output signal from the $O_2$ sensor is delayed by a time TLR1 or TLR2 when the output signal shifts from lean to rich, and is delayed by the time TRR0 when the output signal shifts from rich to lean.

As shown in FIG. 5(e), the feedback correction coefficient CFB is determined in accordance with the lean delay time TLR and the rich delay time TRR, and further with a rich skip amount PSR, a lean skip amount PSL, a rich integral constant KIR, and a lean integral constant KIL. The rich skip amount PSR is a value which is added when the delayed $O_2$ sensor output signal is changed from rich to lean so as to promptly control the fuel quantity in response to the signal obtained by the $O_2$ sensor, and the lean skip amount PSL is a value which is reduced when the delayed $O_2$ sensor output signal is changed from lean to rich so as to promptly control the fuel quantity in response to the signal obtained by the $O_2$ sensor.

On the other hand, the rich integral constant KIR is a value which is integrally added as time passes so that the air-fuel ratio approaches the theoretical air-fuel ratio, and the lean integral constant KIL is a value which is integrally reduced as time passes so that the air-fuel ratio approaches the theoretical air-fuel ratio.

If the air-fuel ratio is required to be adjusted to a richer value, it can be realized by setting the lean delay time TLR to be longer than the rich delay time TRR. Or, it can be realized by setting the rich skip amount PSR to be larger than the lean skip amount PSL. Or, it can be realized by setting the rich integral constant KIR to be larger than the lean integral constant KIL.

In the first embodiment described above, the lean delay time TLR is varied in accordance with the amount of engine load. Even if the output of the $O_2$ sensor 14 ($O_2$ sensor output signal in FIG. 5(a)) is changed from lean to rich, the judgment of the air-fuel ratio (judgment signal in FIG. 5(d)) is delayed during the lean delay time TLR obtained in response to the amount of engine load. Therefore, the air-fuel ratio control continues to make the air-fuel ratio richer, thereby modifying the lean shift phenomenon of the $O_2$ sensor 14 and performing an accurate air-fuel ratio control.

Though the lean delay time TLR is varied in the first embodiment, it is of course possible to vary the rich delay time TRR. In that case, the rich delay time TRR is varied in response to the engine load such that the rich delay time TRR becomes larger when the engine load is heavy, but becomes smaller value when the engine load is light.

FIGS. 7(a) and 7(b) show a timing chart in accordance with a second embodiment of the invention.

In this embodiment, the rich skip amount PSR is varied in response to the engine load to become a large value PSR1 when the engine load is light, but become a smaller value PSR2 when the engine load is heavy. In this case, other control variables such as the lean skip amount PSL, the lean delay time TLR, the rich delay time TRR, the rich integral constant KIR, and the lean integral constant KIL are fixed at predetermined values.

The calculation of the rich skip amount PSR can be performed in the same way as the calculation of the lean delay time TLR. That is, this calculation may be performed such that a load characteristic constant K3 is obtained by comparing the intake air amount Qa with a characteristic representing a relationship between a load characteristic constant K3 and an intake air amount Qa, which relationship is stored in memory in the control unit 16 in the form of a control map similar to FIG. 3. A methanol density characteristic constant K4 is obtained by comparing the methanol density MR with a characteristic representing a relationship between a methanol density characteristic constant K2 and a methanol density MR, which is stored in memory in the control unit 16 in the form of a control map similar to FIG. 4.

Accordingly, the actual rich skip amount PSR is calculated according to the following equation:

$$PSR = PSRO \times K3 \times K4,$$

where PSRO is a rich skip amount corresponding to a pure gasoline engine.

Though the rich skip amount PSR is varied in the second embodiment, it is of course possible to vary the lean skip amount PSL. In that a case, the lean skip amount PSL is varied in response to the engine load to become a smaller value when the engine load is light, but become a larger value when the engine load is heavy.

FIGS. 8(a) and 8(b) show a timing chart in accordance with a third embodiment of the invention.

In this embodiment, the rich integral constant KIR is varied in response to the engine load to become a larger value KIR1 when the engine load is light, but become a smaller value KIR2 when the engine load is heavy. In this case, other control variables such as the lean integral constant KIL, the lean delay time TLR, the rich delay time TRR, the rich skip amount PSR, and the lean skip amount PSL are fixed at predetermined values.

The calculation of the rich integral constant KIR can be performed in the same way as the calculation of the lean delay time TLR. That is, this calculation may be performed such that a load characteristic constant K5 is obtained by comparing the intake air amount Qa with a characteristic representing a relationship between a load characteristic constant K5 and an intake air amount Qa, which relationship is stored in memory in the control unit 16 in the form of a control map similar to FIG. 3. A methanol density characteristic constant K6 is obtained by comparing the methanol density MR with a characteristic representing a relationship between a methanol density characteristic constant K6 and a methanol density MR, which relationship is stored in memory in the control unit 16 in the form of a control map similar to FIG. 4.

Accordingly, the actual rich integral constant KIR is calculated according to the following equation:

$$KIR = KIRO \times K5 \times K6,$$

where KIRO is a rich integral constant corresponding to a pure gasoline engine.

Though the rich integral constant KIR is varied in the third embodiment, it is of course possible to vary the lean integral constant KIL. In that case, the lean integral constant KIL is varied in response to the engine load to become a smaller value when the engine load is light, but become a larger value when the engine load is heavy.

It will be apparent from the above that many modifications and variations may be made based on the above descriptions by those skilled in the art without departing from the spirit and scope of the appended claims.

We claim:

1. An air-fuel ratio control apparatus for an alcohol engine driven by fuel containing an alcohol component for controlling an air-fuel ratio to approach a theoretical air-fuel ratio in response to an output signal of an oxygen detecting means which detects an oxygen density of exhaust gas, said apparatus comprising:
   engine load detecting means for detecting engine load; and
   correcting means for correcting the air-fuel ratio controlled by the output signal of the oxygen detecting means to be rich in response to the engine load detected by the engine load detecting means such that the degree of the correction by the correcting means becomes richer as the engine load becomes small.

2. An air-fuel ratio control apparatus in accordance with claim 1, further comprising alcohol density detecting means for detecting alcohol density in fuel, wherein said correcting means corrects the air-fuel ratio to be rich in response to the alcohol density detected by the alcohol density detecting means such that a degree of correction by the correcting means becomes richer as the alcohol density becomes large.

3. An air-fuel ratio control apparatus in accordance with claim 2, in which the correction means adjusts the degree of correction according to a load coefficient based on the engine load and an alcohol coefficient based on the alcohol density.

4. An air-fuel ratio control apparatus in accordance with claim 3, in which the load coefficient is obtained by comparing the engine load with a characteristic line representing a relationship between the load coefficient and the engine load, which relationship is stored in a microprocessor memory in the correcting means in the form of a control map.

5. An air-fuel ratio control apparatus in accordance with claim 3, in which the alcohol coefficient is obtained by comparing the alcohol density with a characteristic line representing a relationship between the alcohol coefficient and the alcohol density, which relationship is stored in a microprocessor memory in the correcting means in the form of a control map.

6. An air-fuel ratio control apparatus in accordance with claim 1, in which the correcting means controls a delay time determined as a time required to shift from rich to lean or from lean to rich, which delay time is varied based on the engine load.

7. An air-fuel ratio control apparatus in accordance with claim 6, in which the delay time is determined by multiplying a base delay time by a correction value.

8. An air-fuel ratio control apparatus in accordance with claim 7, in which the alcohol engine uses a combined fuel including gasoline and alcohol, and the base delay time is the same as that of a pure gasoline engine.

9. An air-fuel ratio control apparatus in accordance with claim 6, in which a fuel injection quantity is determined based on at least a feedback correction coefficient, and the correcting means adjusts the feedback correction coefficient based on the lean delay time.

10. An air-fuel ratio control apparatus in accordance with claim 9, in which said fuel injection quantity is further determined based on a cooling water temperature coefficient and an alcohol density coefficient.

11. An air-fuel ratio control apparatus in accordance with claim 1, wherein said engine load detecting means detects engine load based on an intake air amount.

12. An air-fuel ratio control apparatus in accordance with claim 1, in which the correcting means controls a skip amount determined as an amount adjusted when the air-fuel ratio shifts from lean to rich or rich to lean, in order to obtain a feedback constant for control of a fuel injection amount, which skip amount is varied based on the engine load.

13. An air-fuel ratio control apparatus in accordance with claim 1, in which the correcting means controls an integral constant determined as a value adjusted when the air-fuel ratio shifts from lean to rich or rich to lean, in order to obtain a feedback constant for control of a fuel injection amount, which integral constant is varied based on the engine load.

* * * * *